United States Patent [19]

Kern

[11] 3,950,681

[45] Apr. 13, 1976

[54] CONTROL SYSTEM FOR AN ELECTRIC VEHICLE INCORPORATING A BRAKE SWITCH

[75] Inventor: Donald F. Kern, Brookfield, Wis.

[73] Assignee: Square D Company, Park Ridge, Ill.

[22] Filed: Aug. 26, 1974

[21] Appl. No.: 500,818

[52] U.S. Cl. .................. 318/139; 318/258; 318/341
[51] Int. Cl.² .......................................... H02P 7/14
[58] Field of Search ............ 318/139, 257, 258, 341

[56] References Cited
UNITED STATES PATENTS

| | | | |
|---|---|---|---|
| 3,562,617 | 2/1971 | Meier et al. ........................ | 318/341 |
| 3,757,180 | 9/1973 | Subler ............................. | 318/341 X |

*Primary Examiner*—Robert K. Schaefer
*Assistant Examiner*—W. E. Duncanson, Jr.
*Attorney, Agent, or Firm*—William H. Schmeling; Harold J. Rathbun

[57] ABSTRACT

A system for controlling a direct current series motor for driving an electric vehicle wherein a brake switch and an interlocking means prevent energization of the motor under certain conditions. The brake switch functions as a dead man's control to render the system inoperative whenever the operator leaves the vehicle unattended. If a direction controlling switch was previously left in a forward or reverse position, the interlocking means requires that the direction controlling switch be returned to a neutral position and then set in the desired forward or reverse position before energization of the motor occurs. The interlocking means, by necessitating return of the direction controlling switch to the neutral position before permitting energization of the motor, prevents the vehicle from moving unexpectedly in an undesired direction or at an excessive or dangerous rate of acceleration.

3 Claims, 1 Drawing Figure

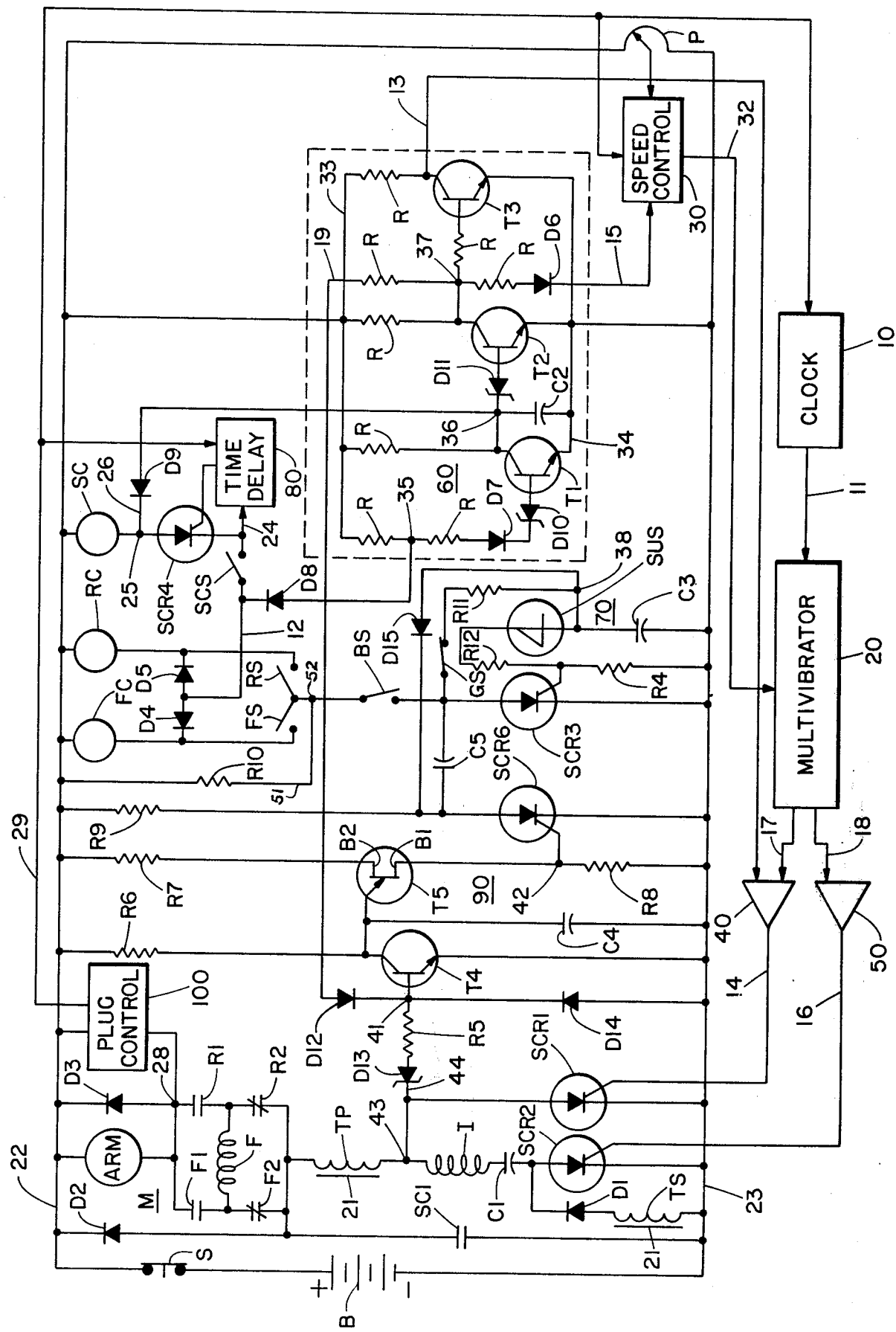

CONTROL SYSTEM FOR AN ELECTRIC VEHICLE INCORPORATING A BRAKE SWITCH

BACKGROUND OF THE INVENTION

The present invention relates to safety devices in a system for controlling the energization of a direct current motor for driving an electric vehicle, and more particularly relates to a brake switch for interrupting the system whenever the vehicle is unattended and to interlocking means which functions whenever a direction controlling switch has previously been left in a forward or reverse position by preventing energization of the motor until the direction controlling switch is first returned to a neutral position and then set for the desired direction of vehicle movement.

Electrically powered vehicles, such as battery operated trucks used in manufacturing facilities and warehouses, are frequently provided with a solid state control system. A typical system is disclosed in U.S. Pat. No. 3,562,617, issued on Feb. 9, 1971 in the names of Roger D. Meier and Philip H. Rusch. In control systems of the type herein contemplated, a main energization controlling silicon controlled rectifier is switched to a conductive state at regulated spaced time intervals by an adjustable periodic switching means, and is switched to a nonconductive state a predetermined time interval after it is switched to a conductive state. The switching of the main rectifier to a nonconductive state is accomplished by a commutating silicon controlled rectifier which is controlled by periodic switching means to deliver a charge on a capacitor through the main rectifier in a reverse direction to thereby commutate the main rectifier to its nonconductive state. While the circuit disclosed in the Meier et al patent application has been successfully used to control electric vehicles and to detect circuit malfunctions therein, further safety features are desirable such as an interrupting means to detect the absence of the operator of the vehicle to interrupt the system and interlocking means to prevent energization of the motor if a direction controlling switch has previously been left in a forward or reverse position until the switch is first returned to a neutral position and then set for the desired direction of vehicle movement.

The brake switch or so called dead man's control functions to render the control system inoperative thereby deenergizing the driving motor when the operator leaves the vehicle unattended. The interlocking means prevents the vehicle from starting in an undesired direction or at an excessive rate of acceleration which could endanger the operator or other people or objects.

It is therefore an object of the present invention to provide a brake switch or dead man's control in a system for controlling an electric vehicle to interrupt a motor energization controlling means whenever the vehicle is unattended.

Another object is to provide an interlocking means to prevent energization of the motor if a direction controlling switch has previously been left in a forward or reverse position until the switch is first returned to a neutral position and then set to the desired direction of vehicle movement.

Further objects and features of the invention will be readily apparent to those skilled in the art from the specification and appended drawing illustrating a preferred embodiment, in which a schematic wiring diagram of a direct current motor control system incorporating the features of the present invention is shown.

SUMMARY OF THE INVENTION

A control system for a direct current series motor for driving an electric vehicle is provided with a brake switch and interlocking means. The brake switch causes a motor energization controlling silicon controlled rectifier to become nonconductive, deenergizes a direction controlling coil, and causes the state of a sequence circuit to change to prevent energization of the motor whenever the vehicle is unattended. The interlocking means prevents energization of the motor of a previously unattended vehicle by means of an open gate switch blocking a signal to a gate of the motor energization controlling silicon controlled rectifier whenever a direction controlling switch has been left in a forward or reverse direction. Only after the direction controlling switch is returned to a neutral position will the open gate switch close allowing a gate signal to render the controlled rectifier conductive. When the operator selects a forward or reverse direction after returning the direction switch to the neutral position, the motor is energized.

BRIEF DESCRIPTION OF THE DRAWING

Appended is a schematic wiring diagram of a control system for an electric vehicle incorporating the brake switch and interlocking means.

DESCRIPTION OF THE PREFERRED EMBODIMENTS

The basic system controls a direct current series motor M adapted for driving a vehicle and includes a master switch having a direction controlling double pole switch FS, RS, a shorting contactor switch SCS, a gate switch CS and a means for operating a slider of a potentiometer P. The switch FS, RS controls operating coils FC and RC of respective contactors having contacts F1-F2 and R1-R2 in a direction controlling circuit for the motor M. A clock 10 continuously sends constant frequency pulses through a lead 11 to a single-shot multivibrator 20 controlled by a speed control 30. When operating, periodic switching means comprising the clock 10, the multivibrator 20, and amplifiers 40 and 50 provides output pulses to gates of a main energization controlling silicon controlled rectifier SCR1 and a commutating silicon controlled rectifier SCR2, respectively. With the master switch in the neutral position, the open contacts F1 and R1 prevent an armature winding ARM and a field winding F of the motor M from being energized. The direction controlling switch FS, RS also remains open thereby preventing current conduction through a lead 12 from a sequencing circuit 60 which causes the circuit 60 to supply an inhibiting signal through a lead 13 to the amplifier 40 thereby preventing a firing signal from appearing at a lead 14 to the main rectifier SCR1. The circuit 60 also supplies a disabling signal over a lead 15 to the speed control 30 which causes a signal on a line 32 to prevent the multivibrator 20 from generating further pulses on the line 18 which would otherwise cause amplified pulses on a line 16 to fire the commutating rectifier SCR2.

The motor M is caused to rotate in either the forward or reverse direction by selective operation of the direction controlling switch FS, RS in series connection with a normally open brake switch BS. The brake switch BS provides safety protection by interrupting the control system whenever an operator leaves the vehicle unattended. Interlocking means in the form of a gate switch GS prevent energization of the motor M whenever the master switch was left in an operative position. The switch GS is normally closed, but opens whenever the direction controlling switch FS, RS leaves the neutral or non-operative position. If the operator left the vehicle master switch in either a forward or reverse position thereby keeping the switch FS, RS closed in one of its two operating positions the gate switch GS remains open. Thus, even if the operator causes the switch BS to close, the continuing open condition of the switch GS will prevent a firing signal from reaching a gate of a motor energization controlling silicon controlled rectifier SCR3. Therefore, although the switch FS, RS is closed and the switch BS is closed, the rectifier SCR3 remains nonconducting, the coils FC and RC remain unenergized, and no voltage is applied to the motor M.

However, when the operator returns the master switch to the neutral position, the switch FS, RS, which was previously closed, opens and the gate switch GS closes. A path is completed through a resistor R10, the switch BS and the switch GS to the time delay circuit 70 which, after a fixed time delay, supplies a signal to the gate of the motor energization rectifier SCR3 causing it to switch to a conductive state. Closure of either pole of the switch FS, RS by movement of the master switch will cause energization of the corresponding coil FC or RC and application of voltage to the motor M by changing the state of contacts F1-F2 or R1-R2 to provide the desired forward or reverse movement of the vehicle.

For forward movement, the conducting motor energization rectifier SCR3 and the closed pole of the switch FS, RS causes energization of the coil FC so that the normally open contact F1 closes and the normally closed contact F2 opens completing circuit through the armature ARM and field winding F thereby operating the motor M in a forward direction. Further, the conducting rectifier SCR3 causes current conduction through the lead 12 from the sequencing circuit 60 which after a time delay, e.g., 100 milliseconds, removes the inhibiting signal through the lead 13 to the amplifier 40 so that the output of the amplifier 40 is controlled exclusively by the signals from the multivibrator 20. Additionally, conduction through lead 12 causes the sequencing circuit 60 to enable the speed control 30 via a lead 15. The delay provided by the sequencing circuit 60 eliminates the effects of contact bounce of the contacts F1 and R1 and assures that, after the contacts F1 or R1 are closed, firing signals will be supplied to the commutating rectifier SCR2 before the amplifier 40 supplies a firing pulse to the main rectifier SCR1.

The enabling signal on the lead 15 permits the control 30 to supply a control signal voltage through a lead 32 which controls the amount of energization of the motor M in response to the adjustment of the speed controlling adjustable potentiometer P. The control 30 provides a controlled voltage level through the lead 32 which will cause the motor M to initially rotate at an adjustable minimum creep speed which increases at a substantially linear adjustable rate to a value determined by the adjustment of the adjustable potentiometer P. The multivibrator 20 is of the monostable type, i.e., arranged to automatically switch to an OFF state and be switched to an ON state in response to a signal from the clock 10. The output signal from the control 30 determines the time interval after which the multivibrator 20 switches to an OFF state. When the multivibrator 20 switches to an ON state in reponse to the signal from the clock 10, a signal is supplied through a lead 17 which causes the amplifier 40 to supply a signal through the lead 14 to the gate of the main rectifier SCR1 which switches the rectifier SCR1 into a conductive state. Similarly, when the multivibrator 20 switches to an OFF state, a signal is supplied through a lead 18 which causes the amplifier 50 to supply a signal through a lead 16 to a gate of the commutating rectifier SCR2 which switches the rectifier SCR2 into a conductive state.

The switching of the rectifier SCR1 to a conductive state completes an energizing circuit for the armature ARM and the field F from a battery B which includes the lead 22, the armature ARM, the closed contact F1, the field F, the closed contact R2, a primary winding TP of a transformer 21, the conducting rectifier SCR1 and the lead 23. The rectifier SCR1 remains conductive after the firing signal to its gate is removed because it is connected across a direct current source. A secondary winding TS of the transformer 21, in response to the current flow in the primary winding TP, provides an output current which is conducted by a diode D1 in a direction to charge a capacitor C1 making the terminal of the capacitor C1 which is connected to the anode of the rectifier SCR2 positive. The charging path for the capacitor C1 includes an inductor I and the conducting rectifier SCR1. The output of the secondary winding TS of the transformer 21 ceases when the core of the transformer 21 saturates. A short time interval after the rectifier SCR1 switches to a conductive state, the multivibrator 20 switches to an OFF state and supplies a signal through the lead 18 which causes the amplifier 50 to supply a signal through the lead 16 which causes the commutating rectifier SCR2 to switch to a conductive state.

The conducting rectifier SCR2 completes a discharge path for the capacitor C1 which discharges through the rectifier SCR1 and causes the rectifier SCR1 to switch to a nonconductive state. After the rectifier SCR1 is switched to a nonconductive state, any charge remaining on the capacitor C1 is discharged through the energizing circuit for the armature ARM and field F. The clock 10 and the speed control 30 are arranged to supply input signals to the multivibrator 20 which causes the multivibrator 20 to periodically switch to an ON state at a constant frequency and to switch from an ON state to an OFF state an adjustable time interval after it has switched to an ON state. Thus the motor field F and the armature ARM windings are energized by pulses of current of varying width dependent upon the output signal from the control 30.

The system also includes a plurality of diodes D2, D3, D4 and D5. The diode D2 conducts during the intervals between the pulses of current to the motor M because of the inductance of the armature ARM and field F of the motor M. The diode D3 conducts during plugging of the motor M. The diodes D4 and D5 prevent both coils FC and RC from being energized when the pole of the direction controlling switch RS, FS is closed.

Movement of the master switch to a position requiring maximum speed of the motor M causes the shorting contactor switch SCS to close and a signal to be supplied through a lead 24 to a time delay circuit 80. The time delay circuit 80 responds to the input signal after a predetermined time delay, which is greater than the adjustable rate of increase of the control 30, to supply a firing signal which switches a silicon controlled rectifier SCR4 to a conductive state. The conducting rectifier SCR4 energizes a coil SC of the shorting contactor which responds and closes a contact SC1 so that the field F and armature ARM are connected directly across the battery B. When the rectifier SCR4 switches to a conductive state, the potential at a junction 25, located between the coil SC and the anode of the rectifier SCR4, approaches the ground potential at the lead 23. The change in potential at the junction 25 is transmitted through a lead 26 to the sequencing circuit 60 which in response thereto supplies a signal through the lead 19 to a malfunction detector 90 which prevents operation of the malfunction detector 90, supplies a signal through the lead 15 to the speed control 30, which reprograms the circuit within control 30 so that the signal through the lead 32 will cause the multivibrator 20 to operate with minimum width ON pulses, and supplies a signal via the lead 13 to the amplifier 40 to inhibit the amplifier 40 from supplying firing signals to the main rectifier SCR1.

The circuit also includes an arrangement for limiting plugging currents. The most severe plugging currents exist when the vehicle is moving at maximum speed in one direction and the master switch is operated to force the vehicle to operate with maximum speed in the opposite direction. Assuming the master switch is positioned for maximum forward speed, the following conditions prevail. The forward pole of the switch FS, RS and the switch SCS are closed so that the coils FC and SC are energized and contacts F1 and SC1 are closed and the contact F2 is open so that the armature ARM and field F are directly connected across the battery B. The initial operation of the master switch from the maximum forward speed position opens the switch SCS while the switch FS remains closed. Opening of the switch SCS causes the coil SC to be deenergized so that the contact SC1 opens and the control of current through the armature ARM and field F is returned to the rectifiers SCR1 and SCR2. As previously described, when the rectifier SCR4 initially was switched to a conductive state, the potential at the junction 25 approached the potential at the lead 23. When the switch SCS opens, the potential at the junction 25 becomes the positive potential of lead 22. The change to a positive potential at the junction 25 and at the lead 26 to the sequencing circuit 60 removes the blocking signal through the lead 19 to the malfunction detector 90, removes a signal through the lead 15 to the control 30, which reprograms the control 30 so that the motor M operates at minimum speed, and removes a signal on the lead 13 to the amplifier 40 which inhibited the amplifier 40 from supplying firing signals to the rectifier SCR1.

The sequence circuit 60 is arranged, when the positive potential at the lead 26 is removed, to provide a slight time delay before changing the signals through the leads 19, 13 and 15 which restores the operation of the malfunction detector 90, the amplifier 40, and the control 30 so that for a brief time interval the motor M coasts and acts as a generator causing current to circulate through the diode D2. As the master switch is moved through the neutral position to operate the vehicle in a reverse direction, the forward pole FS of the switch FS, RS opens and the reverse pole RS closes. The opening of the forward pole FS of the switch FS, RS interrupts the energizing circuit for the coil FC so that the contact F1 opens and the contact F2 closes. However, the anode circuit for the rectifier SCR3 is not interrupted because of the conductive path of resistor R10. The closing of the reverse pole RS of the switch FS, RS completes a circuit through the coil RC to the anode of the rectifier SCR3. The continuing conductive state of the rectifier SCR3 causes the coil RC to be energized so that the contact R1 closes and contact R2 opens.

The system is thus conditioned to energize the motor M with pulses of plugging current, as caused by the pulsed conduction of the rectifier SCR1, to cause the motor M to exert torque in the reverse direction while the vehicle is still moving in a forward direction. During plugging, a counter EMF appears across the armature ARM and the diode D3 and the diode D3 conducts current and causes the polarity at a junction 28 to become positive relative to the lead 22. The voltage drop across the diode D3 is supplied as an input to a plug control 100 which responds thereto and supplies an output signal on a lead 29. The signal from the lead 29 as supplied to the time delay circuit 80 prevents the rectifier SCR4 from conducting and thus the shorting contactor coil SC from being energized. The signal from the lead 29 as supplied to the clock 10 causes the clock 10 to decrease the frequency of its output pulses so that the ON pulses causing the pulse conduction of the rectifier SCR1 are spaced further apart. Finally the signal as supplied by the lead 29 to the control 30 causes the control 30 to provide an output signal to the multivibrator 20 which causes conduction intervals of the rectifier SCR1 to be minimal so that the motor M is energized for operation at less than minimum speed.

The gradual decrease in the counter EMF as the vehicle approaches a stop is reflected in a decrease in positive potential at the junction 28. The plugging control 100 in response to the decreasing positive potential at the junction 28 decreases the signal to lead 29 which permits the clock 10 to increase the frequency of its output pulses, the control 30 increases the intensity of its output signal on the lead 32 so the conduction intervals of the rectifier SCR1 are increased and the time delay circuit 80 is conditioned to switch the rectifier SCR4 to a conductive state if the switch SCS is closed to cause the shorting contactor to energize for maximum motor energization in the reverse direction.

The sequence circuit 60 includes a plurality of transistors T1, T2 and T3, a capacitor C2, load resistors each designated by the letter R diodes D6, D7, D8 and D9, and zener diodes D10 and D11. The transistors T1, T2 and T3 are of the NPN type and have their collector terminals connected through respective load resistors R to a lead 33 which is connected to the lead 22 and their emitter terminals connected through a lead 34 directly to the lead 23. The transistor T1 has its base connected through the zener diode D10, the diode D7, a load resistor R to a junction 35 which in turn is connected through a load resistor R to the lead 33 and through the diode D8 to the lead 12. The transistor T2 has its base connected through the zener diode D11 to a junction 36 which in turn is connected through the capacitor C2 to the lead 34 and through the diode D9 and the lead 26 to the junction 25. The junction 36 is also connected to the collector of the transistor T1. The transistor T3 has its base connected through a resistor R and a junction 37 to the collector of the transistor T2. The junction 37 is connected through a load resistor R and the diode D6 thereby supplying the lead 15 with a signal indicative of the conductive state of the transistor T2. The junction 37 is also connected through a load resistor R, the lead 19 and a diode D12 to supply the malfunction detector 90 with a signal also indicative of the conductive state of the transistor T2. The collector of the transistor T3 is connected through the lead 13 to supply a signal indicative of conductive state of the transistor T3 to the amplifier 40.

The time delay circuit 70 includes a capacitor C3, a silicon unilateral-type switch SUS and resistors R11, R12 and R4. The capacitor C3 is connected between the lead 23 and a junction 38 which is connected through the resistor R11 and the normally closed gate switch GS to the anode of the rectifier SCR3 and through the switch SUS and the resistor R12 to the gate of the rectifier SCR3. The resistors R12 and R4 are connected in series between the lead 23 and the switch SUS.

The malfunction detector 90 includes a capacitor C4, a transistor T4, a unijunction transistor T5, a silicon controlled rectifier SCR6, a zener diode D13, resistors R5, R6, R7, R8 and R9, a capacitor C5 and diodes D14 and D15. The base of the transistor T4 is connected to a junction 41 which in turn is connected through the diode D14 to the lead 23 and through the diode D12 and the lead 19 to receive signals appearing at the junction 37. The junction 41 is also connected through the resistor R5 and the zener diode D13 to the anode of the main rectifier SCR1. The collector of the transistor T4 is connected through the resistor R6 to the lead 22 and through the capacitor C4 to the lead 23. The terminal of the capacitor C4 which is connected to the collector of the transistor T4 is also connected to the emitter of the unijunction transistor T5. The emitter of the transistor T4 is directly connected to the lead 23. The transistor T5 has its base two electrode B2 connected through the resistor R7 to the lead 22 and its base one electrode B1 connected through the resistor R8 to the lead 23. A junction 42, located between the base one electrode B1 and the resistor R8, is connected to the gate of the rectifier SCR6. The rectifier SCR6 has its cathode connected to the lead 23 and its anode connected through the resistor R9 to the lead 22. The capacitor C5 is connected between the anodes of the rectifiers SCR3 and SCR6 and the diode D15 is connected between the anode of the rectifier SCR6 and the junction 38 in the time delay circuit 70.

Prior to the closure of a pole of the switch FS, RS, diode D8 is nonconducting, causing a positive potential to be present at the junction 35. The positive potential at the junction 35 overcomes the blocking ability of the zener diode D10 and biases the transistor T1 into a conductive state to complete a discharge circuit for the capacitor C2 that includes the junction 36 and the collector to the emitter of the transistor T1. Also, the conducting transistor T1 and the discharged capacitor C2 render the transistor T2 nonconductive which causes a positive potential to be present at the junction 37. The positive potential at the junction 37, as transmitted via the lead 19 and the diode D12 to the base of the transistor T4, biases the transistor T4 into conduction. Similarly, the positive potential at the junction 37 biases the transistor T3 into conduction so that the lead 13 inhibits the amplifier 40 from supplying firing signals to the rectifier SCR1. Finally, the positive potential at the junction 37 transmitted via the diode D6 and the lead 15, programs the circuit within the speed control 30 to cause the multivibrator 20 to supply the amplifier 40 with minimum width ON pulses.

According to this invention, there is provided the normally open brake switch BS having one of its terminals connected to the direction controlling switch FS, RS and through the coils FC and RC, to the lead 22. The same terminal of the switch BS is also connected to the lead 22 through a resistor R10. The other terminal of the brake switch BS is connected to the anode of the rectifier SCR3 and to the normally closed gate switch GS which controls the time delay circuit 70.

The brake switch BS provides a so-called dead man's function, and it is installed on the vehicle in such a manner that it is closed when the operator is on the vehicle and resumes its normally open position whenever the operator leaves the vehicle. Preferably, it is a normally open pressure switch positioned in the seat of the vehicle which closes when the operator is on the seat. Alternatively, it could be a switch in the handle of the master switch which closes upon pressure from the operator's hand.

An interlocking means in the form of a gate switch GS is provided to prevent energization of the motor M whenever the direction controlling switch FS, RS is in an operative position. The normally closed gate switch GS assumes a closed state whenever the poles of the direction controlling switch FS, RS are both open. Conversely, whenever either pole of the switch FS, RS is closed, the switch GS assumes an open state.

The operation according to the invention will now be considered. When the presence of the operator causes the brake switch BS to close and assuming that the poles of the direction controlling switch FS, RS are both open, then the gate switch GS will be closed. Conductive path means in the form of the resistor R10 cause a positive potential to be impressed on the anode of the rectifier SCR3 through the closed brake switch BS. The positive potential is also impressed on the timing circuit 70 through the closed gate switch GS. The capacitor C3 charges through the resistor R11 causing a junction 38 to increase in potential. After a brief time delay, the positive potential at the junction 38 rises sufficiently to exceed the blocking ability of a solid state switch SUS causing the switch SUS to conduct and place a positive potential through the resistor R12 on the gate of the motor energization controlling rectifier SCR3. A resistor R4 is referenced to the lead 23 from the gate of the rectifier SCR3. Since the cathode of the rectifier SCR3 is also referenced to the lead 23, the positive potential at the gate of the rectifier SCR3 from the switch SUS causes the rectifier SCR3 to switch to a conductive state. Conduction of the rectifier SCR3 is sustained through the path provided by the resistor R10 and the switch BS. Thus, the rectifier SCR3 is conductive before the operator selects either forward or reverse movement of the vehicle by moving the master switch to close the appropriate pole of the switch FS, RS.

When the operator causes closure of the switch FS, RS, the corresponding coil FC or RC will immediately be energized due to the prior conductive state of the rectifier SCR3. Simultaneously, the junction 35 of the sequence circuit 60 will drop to a low potential because current is now conducted through the path formed by the diode D8, the lead 12, either the diode D5 and the switch RS or the diode D4 and the switch FS, the switch BS, and the rectifier SCR3 to the lead 23. The low potential at the junction 35 permits the zener diode D10 to block current to the base of the transistor T1 causing a transistor T1 to become nonconductive so that a timing capacitor C2 charges through a collector resistor R of the transistor T1 thereby increasing the positive potential at a junction 36. After a brief time interval the positive potential at the junction 36 exceeds the blocking ability of a zener diode D11 causing a transistor T2 to switch to a conductive state and the removal of a positive polarity signal at the junction 37. The removal of the potential at the junction 37 permits conduction of the transistor T4 of the malfunction detector 90 to be controlled in a manner hereinafter described and causes the speed control 30 to respond to the adjustment of the potentiometer P. Further, the removed potential at the junction 37 causes the transistor T3 to switch to a nonconductive state and the potential at the collector of the transistor T3 rises, providing the lead 13 to the amplifier 40 with a signal which will allow the amplifier 40 to begin pulsing the gate of the rectifier SCR1 as previously described. Thus, energization of the coil FC or RC with the associated change of state of the contacts F1-F2 or R1-R2 and the periodic conduction of the controlled rectifiers SCR1 and SCR2 cause energization of the motor M and the vehicle begins to move in the selected forward or reverse direction.

Further according to the invention, the arrangement of the resistor R10, the brake switch BS, the gate switch GS, the delay circuit 70 and the rectifier SCR3 provide an interlocking function to prevent energization of the motor M if either pole of the switch FS, RS is closed prior to closing the brake switch BS. The conductive state of the rectifier SCR3 and the position of the switch FS, RS determine whether or not the motor M is energized. Energization of the motor M occurs when the rectifier SCR3 is conductive and either contact FS or RS is closed. Then the lowered potential of the lead 12 causes the sequence circuit 60 to cancel the inhibit signal on the lead 13 to the amplifier 40, thereby allowing periodic pulses from the multivibrator 20 to be transmitted to the gate of the rectifier SCR1. If either the rectifier SCR3 is nonconductive or both poles of the switch FS, RS are open, the opposite circuit conditions exist, rendering the rectifier SCR1 nonconductive. Thus it will be appreciated that the gate switch GS behaves as an interlock since the normally closed switch GS is open whenever either pole of the switch FS, RS is closed. When the operator has previously left the switch FS, RS closed and, the return of the operator causes the brake switch BS to close, the switch GS, which is open whenever the switch FS, RS is closed, will prevent any voltage signal from reaching the delay circuit 70 and hence the gate of the rectifier SCR3. Thus the rectifier SCR3 will remain nonconductive and the motor M unenergized.

Only after the master switch is returned to a neutral position thereby opening the switch FS, RS and the brake switch BS is caused to remain closed will a voltage signal be applied to the delay circuit 70 to render the rectifier SCR3 conductive.

Thus the conductive path provided by the resistor R10 will render the rectifier SCR3 conductive only if the direction controlling switch FS, RS is in a neutral position, i.e. neither pole thereof is closed, and the brake switch BS is closed. Closure of either pole of the switch FS, RS prior to closure of the brake switch BS causes the rectifier SCR3 to remain nonconductive due to the open gate switch GS preventing a triggering signal from reaching the gate of the rectifier SCR3. Thus, the operator is prevented from starting the vehicle whenever the master switch was previously left in a forward or reverse position, thereby preventing the vehicle from accelerating to a potentially unsafe speed or from moving the vehicle in an undesired direction. Only after the operator first returns the master switch to the neutral position can the motor M be energized by selecting the proper direction of vehicle movement and an appropriate speed or rate of acceleration.

A simple modification to the control system enables the coils FC, RC and SC to be energized from a higher direct current voltage source, for example 72 volts, while operating the remaining circuitry of the system at a lower voltage, for example 24 volts. The insertion of a diode (not shown) in the lead 51 between the resistor R10 and the junction 52 prevents the higher voltage source from affecting the lower voltage source whenever the direction controlling switch FS, RS is closed and either the brake switch BS is open or the rectifier SCR3 is nonconductive. The diode is poled to block current from the higher voltage source to the lower voltage source. The diode is required when two voltage sources are used because the resistor R10 must be of a sufficiently low resistive value to sustain conduction of the rectifier SCR3 when neither pole of the switch FS, RS is closed.

One of the possible modes of failure occurs when the main rectifier SCR1 switches to a conductive state and becomes incapable of being commutated to a nonconductive state by the charge on the capacitor C1 when the commutating rectifier SCR2 switches to a conductive state. When this type of failure occurs, the motor M is energized by uncontrolled current. The malfunction detector 90 is provided in the circuit to detect this mode of failure and render the circuit inoperative.

The malfunction detector 90 operates as follows. Each time the rectifier SCR1 switches to a conductive state, the potential at a junction 43 at the anode of the rectifier SCR1 decreases from the positive potential of the lead 22 and approaches the potential of lead 23. The change to an essentially zero potential at the junction 43 is transmitted via a lead 44 to the malfunction detector 90. When the positive potential present at the junction 43 is sufficient to overcome the blocking ability of the zener diode D13, the transistor T4 is biased into conduction and discharges the timing capacitor C4. However the presence of a low potential at the junction 43 as when the rectifier SCR1 is conductive, permits the zener diode D13 to resume its blocking condition so that the transistor T4 switches to a nonconductive state and the capacitor C4 begins to charge through the resistor R6 thereby making the emitter of the unijunction transistor T5 positive. Thus, each time the potential at the junction 43 becomes positive, the lead 44 supplies a signal to the malfunction detector 90 which resets the timing circuit comprising the resistor R6 and the capacitor C4 within the malfunction detector 90. The timing period is designed to exceed the spaced time intervals between signals supplied by the clock 10. Thus, if the controlled rectifier SCR1 is not switched to a nonconductive state after a predetermined time interval, the capacitor C4 charges to a voltage which causes the transistor T5 to switch to a conductive state and supply a firing signal through the junction 42 to the gate of the rectifier SCR6 which in response thereto also switches to a conductive state. The rectifier SCR6 upon being switched to a conductive state, remains in the conductive state because it is connected through the resistor R9 across a DC supply. Conduction by the rectifier SCR6 discharges the capacitor C5 through the conducting rectifier SCR3 in a reverse direction to the current flow through the rectifier SCR3. The discharge current from the capacitor C5 causes the rectifier SCR3 to switch to a nonconductive state and the coil FC becomes deenergized. Deenergization of the coil FC causes the contact F1 to open and the contact F2 to close so that the motor M is deenergized and the rectifier SCR1 is nonconducting. The rectifier SCR1 switches to a nonconductive state. Further, when the rectifier SCR6 conducts, its anode potential approaches the potential of the lead 23 which permits the diode D15 to conduct current from the junction 38 within the time delay circuit 70 thereby preventing the time delay circuit 70 from supplying firing pulses to the rectifier SCR3. Thus the coil FC or RC remains deenergized as long as the rectifier SCR6 conducts.

Further, in event the rectifier SCR2 is incapable of switching to a conductive state or is not switched to a conductive state within a predetermined time interval after the rectifier SCR1 switches to a conductive state, the malfunction detector 90 causes the rectifier SCR3 to switch to a nonconductive state in the same manner as previously described for the rectifier SCR1.

After a malfunction as above described occurs, the rectifier SCR6 remains in a conductive state, the rectifier SCR3 remains nonconductive because the diode D15 prevents a voltage buildup on the capacitor C3, and the sequence circuit 60 is programmed to prevent firing pulses from being delivered to the rectifier SCR1. The system is restored to its normal operating condition by opening a switch S which acts as a reset switch and is included in the circuit to disconnect the battery B from the remaining circuitry. When the switch S is opened, the rectifier SCR6 is rendered nonconductive. Reclosure of the switch S reconditions the circuits for operation in a manner as heretofore described.

Another possible malfunction which may occur is the failure of the contact SC1 to open after the coil SC is deenergized, as may be experienced when the contact SC1 becomes welded due to high currents in the motor M. As was previously stated, closure of the switch SCS causes the rectifier SCR4 to switch to a conductive state and the coil SC to be energized. The energized coil SC causes the contact SC1 to close. The circuit is thus conditioned for energizing the motor M with maximum current. Further, when the coil winding SC is energized, the potentials at the junctions 25 and 36 decrease to about the potential of the lead 23 so that the transistor T2 switches from a conductive to a nonconductive state and causes a positive potential to appear at the junction 37. The positive potential at the junction 37 is transmitted via the lead 19 and the diode D12 to the base of the transistor T4 which, in response thereto, switches to a conductive state and completes a discharge path for the capacitor C4. Thus during periods when the contact SC1 and the switch SCS are closed, the malfunction detector 90 is rendered inoperative.

When it is desired to reduce the speed of the motor M from a maximum, the switch SCS is opened to deenergize the coil SC. In the event that the contact SC1 remains closed after the coil SC is deenergized, the circuit will respond in detecting the malfunction as follows. The open switch SCS causes a positive potential to appear at the junction 25 which, together with the charge on capacitor C2, causes the transistor T2 to switch to a conductive state. The conducting transistor T2 causes the potential at the junction 37 to approach the potential of lead 23 which terminates the blocking signal through the lead 19 and the diode D12 and thereby restores operation of the malfunction detector 90. Similarly, the closed malfunctioning contact SC1 causes the potential at the junction 43 to be maintained at the potential of lead 23, allowing the capacitor C4 to charge to a level which switches the unijunction transistor T5 into a conductive state. The conducting transistor T5 causes the rectifier SCR6 to switch to a conductive state and the rectifier SCR3 to switch to a nonconductive state thereby deenergizing the coil FC or RC which causes the opening of the contact F1 or R1 and the consequent deenergizing of the motor M in a manner previously described.

The constructional details of the speed control 30 will be readily understood to those skilled in the art. However, if further understanding is required, the details thereof are clearly set forth in U.S. Pat. No. 3,551,774 issued on Dec. 29, 1970 in the name of Philip H. Rusch.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. An improvement in a control system for an electric vehicle including a direct current voltage source for supplying energy; a direct current motor for driving the vehicle; a main silicon controlled rectifier; a set of normally open reversing contacts; means connecting the main rectifier, the set of reversing contacts, and the motor in a series circuit across the source; a commutating silicon controlled rectifier; periodic switching means for switching the main rectifier to a conductive state and for alternately switching the commutating rectifier to a conductive state to render the main rectifier nonconductive thereby to supply the motor with spaced pulses of energy; a pair of direction controlling coils for controlling the set of contacts; a direction controlling switch movable in opposite directions from a neutral position for selecting the desired direction of vehicle movement by selectively energizing the appropriate one of the pair of coils and connected in series with the coils across the source; a brake switch having normally open contacts; a motor energization controlling silicon controlled rectifier for inhibiting the periodic switching means from switching the main rectifier to a conductive state whenever the motor energization controlling rectifier is nonconductive and connected in series with the coils, the direction controlling switch and the brake switch across the source; and means for switching the energization controlling rectifier to a nonconductive state in event the commutating rectifier is incapable of switching the main rectifier to a nonconductive state, the improvement comprising, means including a switch having contacts responsive to the position of the direction controlling switch for causing the energization controlling rectifier to switch to a conductive state when the direction controlling switch is in a neutral position and the brake switch is closed and for inhibiting the conduction of the energization controlling rectifier when the direction controlling switch is displaced from the neutral position and the contacts of the brake switch are moved from the open to the closed position.

2. An improvement in a control system for an electric vehicle including a direct current voltage source for supplying energy; a direct current motor for driving the vehicle; a main silicon controlled rectifier; a set of normally open reversing contacts; means connecting the main rectifier, the set of reversing contacts, and the motor in a series circuit across the source; a commutating silicon controlled rectifier; periodic switching means for switching the main rectifier to a conductive state and for alternately switching the commutating rectifier to a conductive state to render the main rectifier nonconductive thereby to supply the motor with spaced pulses of energy; a pair of direction controlling coils for controlling the set of contacts; a direction controlling switch for selecting the desired direction of vehicle movement by selectively energizing the appropriate one of the pair of coils and connected in series with the coils across the source; a motor energization controlling silicon controlled rectifier for inhibiting the periodic switching means from switching the main rectifier to a conductive state whenever the motor energization controlling rectifier is nonconductive and connected in series with the coils and the direction controlling switch across the source; the improvement comprising interlocking means for preventing the motor energization controlling rectifier from being rendered conductive when the direction controlling switch was previously left in an operative position.

3. The improvement in claim 2 wherein the interlocking means comprises the combination of a conductive path from the source to an anode of the motor energization controlling rectifier and a gate switch between the anode and a gate of the motor energization controlling rectifier and which is closed only when the direction controlling switch is in a neutral position thereby rendering the motor energization controlling rectifier conductive before the direction controlling switch is set to a forward or reverse position.

* * * * *